US008992243B2

(12) United States Patent
Cameron et al.

(10) Patent No.: US 8,992,243 B2
(45) Date of Patent: Mar. 31, 2015

(54) SEALING FEATURE FOR USE WITH CONNECTORS

(71) Applicant: Inova, Ltd., Grand Cayman (KY)

(72) Inventors: Randall V. Cameron, Airdrie (CA); Terry E. Wood, Calgary (CA)

(73) Assignee: Inova Ltd., Grand Cayman (KY)

( * ) Notice: Subject to any disclaimer, the term of this patent is extended or adjusted under 35 U.S.C. 154(b) by 84 days.

(21) Appl. No.: 13/750,528

(22) Filed: Jan. 25, 2013

(65) Prior Publication Data

US 2013/0189867 A1  Jul. 25, 2013

Related U.S. Application Data

(60) Provisional application No. 61/590,630, filed on Jan. 25, 2012.

(51) Int. Cl.
H01R 13/52 (2006.01)
H01R 43/00 (2006.01)
G01V 1/20 (2006.01)

(52) U.S. Cl.
CPC ............ *H01R 13/5202* (2013.01); *H01R 43/00* (2013.01); *H01R 13/5219* (2013.01); *G01V 1/202* (2013.01)
USPC .......................................... 439/271; 439/587

(58) Field of Classification Search
USPC .................. 439/271, 275, 278, 587
See application file for complete search history.

(56) References Cited

U.S. PATENT DOCUMENTS

| 3,477,061 | A | * | 11/1969 | Stephenson | 439/589 |
|---|---|---|---|---|---|
| 3,945,701 | A | | 3/1976 | Boeke et al. | |
| 4,079,193 | A | | 3/1978 | Channell | |
| 4,173,349 | A | | 11/1979 | Neale, III | |
| 4,214,802 | A | * | 7/1980 | Otani et al. | 439/275 |
| 4,268,041 | A | | 5/1981 | Sovish et al. | |
| 4,588,247 | A | * | 5/1986 | Grappe et al. | 439/271 |
| 4,795,360 | A | * | 1/1989 | Newman et al. | 439/278 |
| 5,451,717 | A | | 9/1995 | Itou | |
| 5,470,248 | A | * | 11/1995 | Wood | 439/281 |
| 5,505,502 | A | | 4/1996 | Smith et al. | |
| 5,595,497 | A | * | 1/1997 | Wood | 439/282 |
| 5,711,685 | A | * | 1/1998 | Wood | 439/587 |
| 5,823,231 | A | | 10/1998 | Kawasaki | |
| 5,860,822 | A | | 1/1999 | Nishide et al. | |
| 6,386,593 | B1 | | 5/2002 | Slais et al. | |
| 7,249,971 | B2 | * | 7/2007 | Burke et al. | 439/589 |
| 7,794,254 | B2 | * | 9/2010 | Marklove et al. | 439/271 |

(Continued)

FOREIGN PATENT DOCUMENTS

EP    0645847 A2    3/1995
EP    2355258 A1    8/2011

(Continued)

*Primary Examiner* — Hae Moon Hyeon
(74) *Attorney, Agent, or Firm* — Mossman, Kumar & Tyler, PC

(57) ABSTRACT

A connector for forming an electrical connection includes a connector body and an insulator disposed in the connector body. The insulator includes a plurality of female contacts and a plurality of passages. Each passage allows access to one of the female contacts and is at least partially defined by a plurality of inwardly projecting rings. The connector also includes a plug having a plurality of male contact male contacts complementary to the female contacts. Each male contact male contact has a tower shaped to sealingly seat within an associated passage in the insulator.

18 Claims, 4 Drawing Sheets

(56) References Cited

U.S. PATENT DOCUMENTS

| | | |
|---|---|---|
| 7,845,980 B1 | 12/2010 | Amidon |
| 8,113,860 B2 * | 2/2012 | Sandwith ...................... 439/271 |
| 8,353,869 B2 | 1/2013 | Ranalletta et al. |
| 8,491,323 B2 | 7/2013 | Ishibashi |
| 2010/0291782 A1 * | 11/2010 | Wade et al. ................... 439/271 |
| 2011/0147009 A1 | 6/2011 | Dupal et al. |

FOREIGN PATENT DOCUMENTS

| | | |
|---|---|---|
| GB | 2131633 A | 6/1984 |
| WO | 0125667 A1 | 4/2001 |

* cited by examiner

US 8,992,243 B2

SEALING FEATURE FOR USE WITH CONNECTORS

CROSS-SECTION TO RELATED APPLICATIONS

This application claims priority from U.S. Provisional Application Ser. No. 61/590,630 filed Jan. 25, 2012, the disclosure of which is fully incorporated herein by reference in its entirety.

FIELD OF THE DISCLOSURE

This disclosure generally relates to sealing arrangements and methods for connectors used to make electrical connections.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (geophones or accelerometers) are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from discontinuities in a subsurface formation, such as those formed by oil and gas reservoirs. The reflections are sensed or detected at the surface by the seismic sensors (hydrophones, geophones, etc.). Data acquisition units deployed in the field proximate the seismic sensors may be configured to receive signals from their associated seismic sensors, at least partially processes the received signals, and transmits the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing, and recording of the seismic waves is referred to as seismic data acquisition.

Such systems may use numerous electrical connections that must be formed in an open environment. This disclosure addresses the need for robust sealing arrangements for connectors that can be used to make connections with a high degree of reliability.

SUMMARY OF THE DISCLOSURE

In aspects, the present disclosure provides a connector for forming an electrical connection. The connector may include a connector body and an insulator disposed in the connector body. The insulator may include a plurality of female contact and a plurality of passages. Each passage allows access to one of the female contacts and is at least partially defined by a plurality of inwardly projecting rings. The connector also includes a plug having a plurality of male contacts complementary to the female contacts. Each male contact has a tower shaped to sealingly seat within an associated passage in the insulator.

In other embodiments, the connector may include a connector body and an insulator disposed in the connector body. The insulator may include a plurality of female contacts, a plurality of passages that allows access to one of the female contacts, and a plurality of sealing rings formed on a surface defining each passage. The connector may also include each plug having a plurality of male contacts complementary to the female contacts, each male contact having a tower shaped to sealingly seat within an associated passage in the insulator.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for selectively locking electrical connections between electrical components used during seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein.

Figure 1:
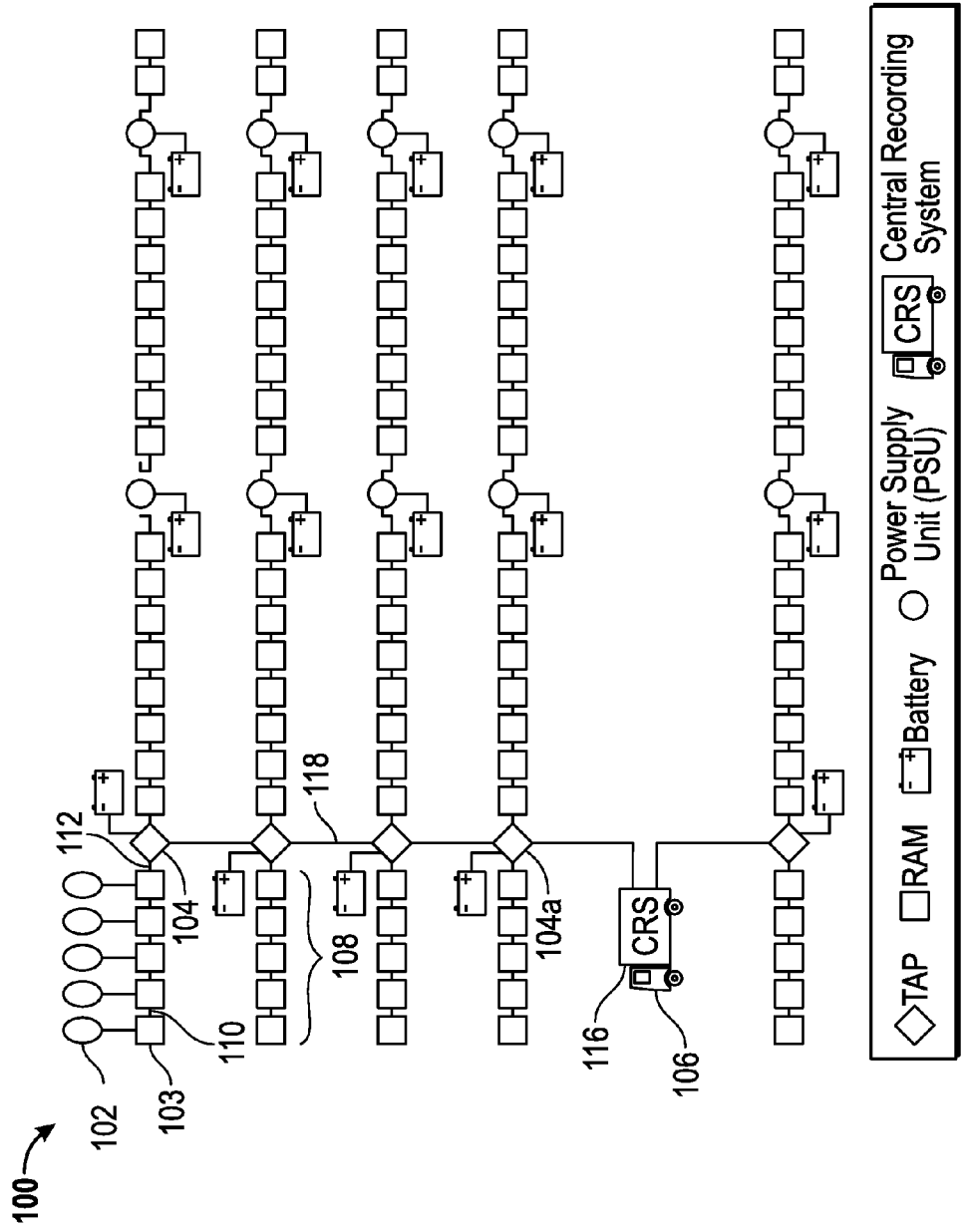
FIG. 1 shows a schematic of a seismic survey system according to one embodiment of the present disclosure.

FIG. 1 depicts an embodiment of a cable seismic data acquisition system 100. Such a system includes an array (string) of spaced-apart seismic sensor units 102. Seismic sensors units 102 may include, but are not limited to, multi-component sensors such as a three-component accelerometer sensor incorporating micro electro-mechanical systems (MEMS) technology, velocity sensors such as a conventional geophone or a pressure sensor such as a conventional hydrophone. Any sensor unit capable of sensing seismic energy may be used. Each sensor unit 102 is typically coupled via cabling to a data acquisition device (such as remote acquisition module (RAM) 103), and several of the data acquisition devices and associated sensor units 102 are coupled via cabling 110 to form a line or group 108. The group 108 is then coupled via cabling 112 to a line tap (such as fiber TAP unit (FTU) 104). Several FTUs 104 and associated lines 112 are usually coupled together by cabling, such as shown by the baseline cable 118.

A RAM 103 may be configured to record analog seismic signals that are generated by the sensors units 102. The RAM 103 may be configured to convert analog signals from the sensor units 102 into digital signals. The digitized information may then be transmitted to an FTU 104. One or more FTU's 104, such as FTU 104a, may be configured to transmit the digitized information to a central recording system (CRS) 106. The devices involved in seismic data acquisition may be collectively referred to as "seismic devices," which may include, but is not limited to: sensor units 102, RAMs 103, and FTUs 104, CRS 106, and other associated auxiliary devices 116.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

As should be appreciated, seismic data acquisition systems, whether cabled-based such as the system 100 or a wireless system, require numerous electrical connections. Moreover, these connections may have to be made "in the field," which subjects the connections to harmful environmental conditions (e.g., dirt, moisture, shock from rough handling, etc.).

Figure 2:
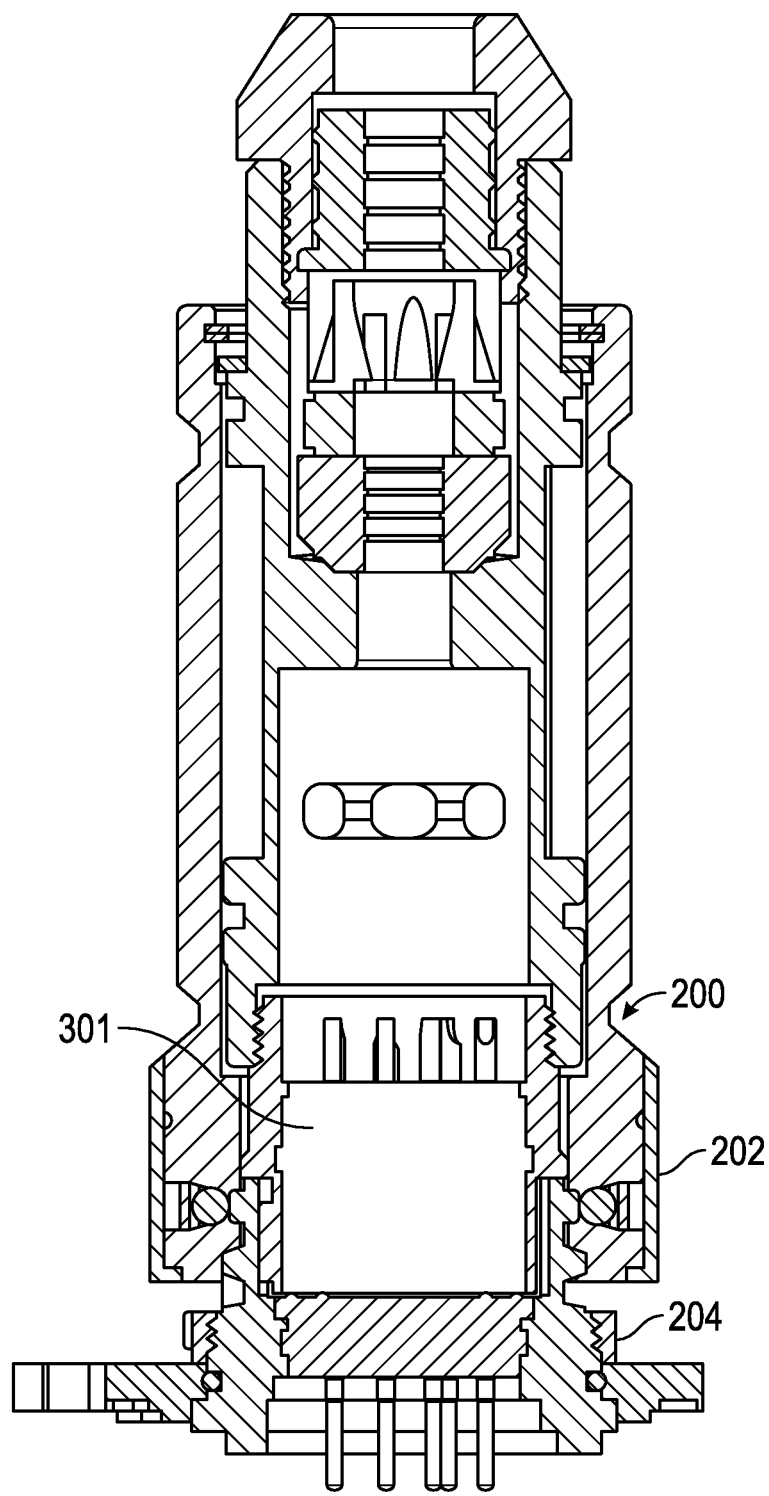
FIG. 2 shows a sectional view of a connector according to one embodiment of the present disclosure.

Referring now to FIG. 2, there is shown one embodiment of a connector 200 that incorporates sealing features that reduce the force necessary to make up a connection while providing enhanced protection from environmental hazards such as water intrusion. The connector 200 includes a connector body 202 and a plug 204. The connector body 202 includes an insulator 301 that cooperates with towers 302 (FIG. 3) in the plug 204 to form a liquid-tight seal within the connector 200. Illustrative embodiments are described below.

Figure 3:
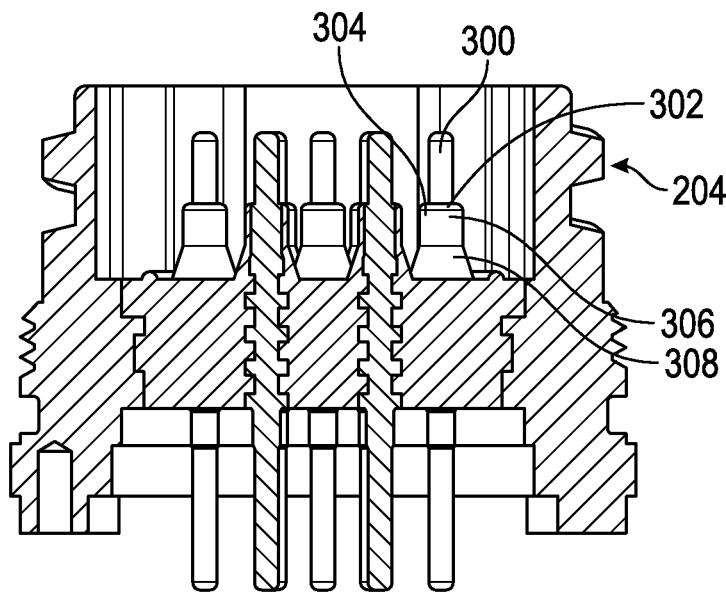
FIG. 3 shows a sectional view of a plug for a connector according to one embodiment of the present disclosure.

Referring now to FIG. 3, the plug 204 may include a plurality of male contacts 300 (or pins) that are partially encased by the towers 302. The male contacts 300 may be a set of conventionally arrayed metal conductors adapted to transmit power and/or data. The towers 302 may be generally tubular members that have one or more inclined or sloped outer surface 304 that provide a cone-line shape. In the embodiment shown, the tower 302 has a first section 306 with a non-varying diameter (e.g., a cylindrical shape) and a second section 308 with a gradually increasing diameter (e.g., a conical shape).

Figure 4:
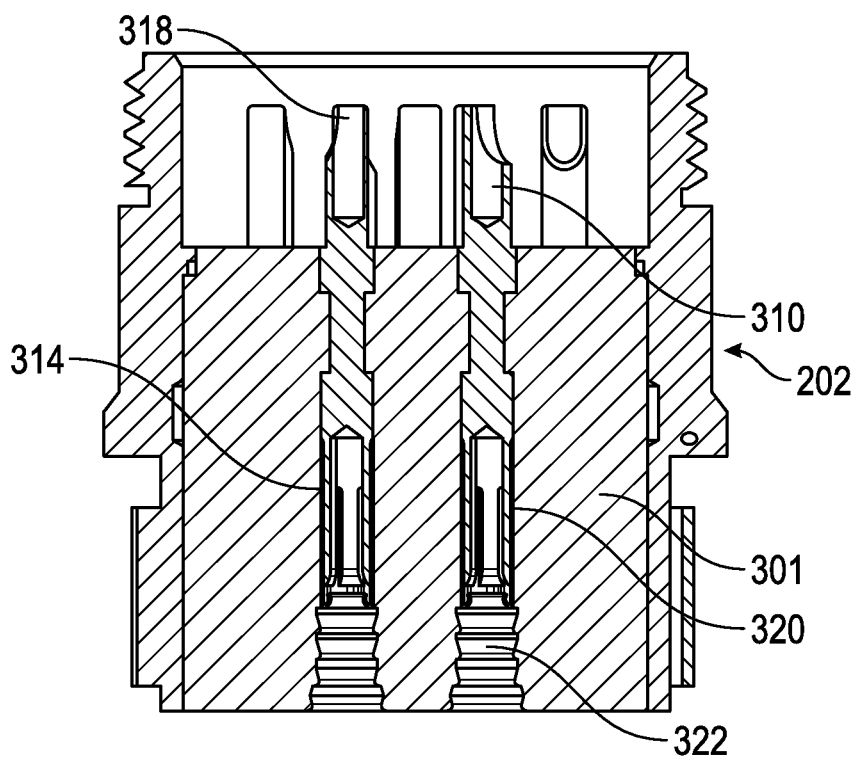
FIG. 4 shows a sectional view of a connector body for a connector according to one embodiment of the present disclosure.

Referring now to FIG. 4, the connector body 202 includes conductors 310 that are at least partially encased in the insulator 301. Each conductor 310 may include female contacts 314 (or socket ends) for receiving a male contact 300 (FIG. 3). The conductor 310 may also include a terminal end 318 adapted to connect with another electrical component (not shown). The insulator 301 may be formed of a non-conductive material such as silicone that is capable of forming a fluid-tight seal with a contacting surface. The insulator 301 includes a plurality of axial passages 320, each of which receives a conductor 310. The female contacts 314 of the conductors 310 terminate at a sealing section 322 of the passage 320.

Figure 5:
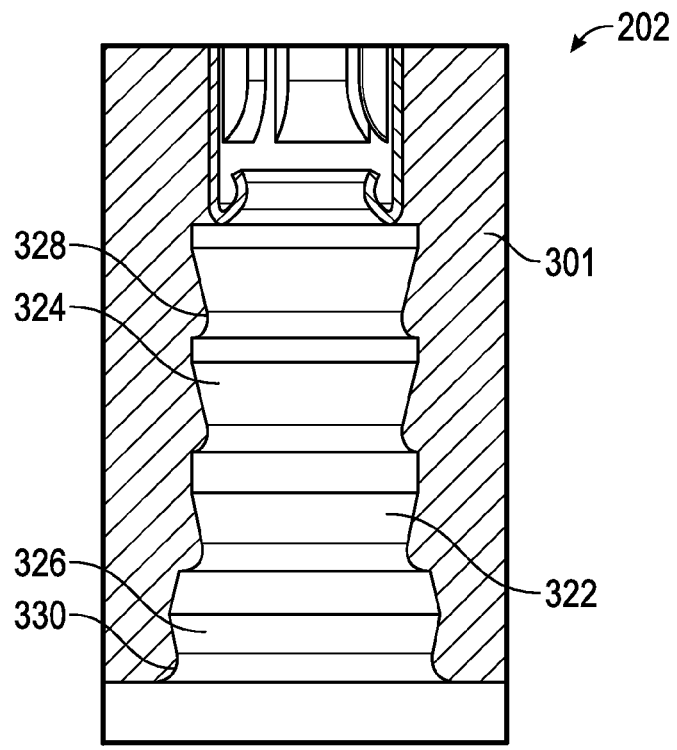
FIG. 5 shows a sealing section of an insulator for a connector body according to one embodiment of the present disclosure.

Referring now to FIG. 5, there is shown a sectional view of the insulator 301 that includes the sealing section 322. The sealing section 322 uses multiple sealing modes to form a fluid barrier with the tower 302 (FIG. 3). In one arrangement, the sealing section 322 may have a first seal section 324 and a second seal section 326, each of which may use a different sealing mode. As shown, the second seal section 326 is accessible by an opening. By varying the sealing modes and the timing at which seals are formed along the sealing section 322, the insertion force needed to assemble the connector 200 (FIG. 2) may be reduced. For instance, the first seal section 324 may use a "cork and bottle" type of seal formed as the tower 302 (FIG. 3) slides through and expands portions of the second sealing section 324. A "cork and bottle" seal is an interfacial seal wherein a seal is formed along an interface around each male contact. The basic components of such a seal include a resilient material displaces into the rigid or hard passage in a socket interface. The second seal section 326 may use a compression seal formed as the tower 302 (FIG. 3) compresses portions of the second seal section 326 with minimal sliding between contacting surfaces.

In one non-limiting embodiment, the first seal section 324 may include one or more rings 328 and the second seal section 326 may include one or more rings 330. The rings 328, 330 are formed by reducing the diameter of the passage 320 (FIG. 4). Thus, the rings 328, 330 are portions of the insulator 301 that projects radially inwardly into the passage. These projections may be considered to form an undulating profile or inner surface that defines the sealing section 322 of the passage 320 (FIG. 3). As shown, the undulating profile may include shapes resembling a portion of a "tear drop." It should be understood, however, that the undulating surface may include hemispheric shapes, oval shapes, or other non-curved shapes such as triangular shapes. Also, while two rings 328, 330 are shown in each section 324, 326, respectively, it should be understood that greater or fewer number of rings 328, 330 may be used.

Figure 6:
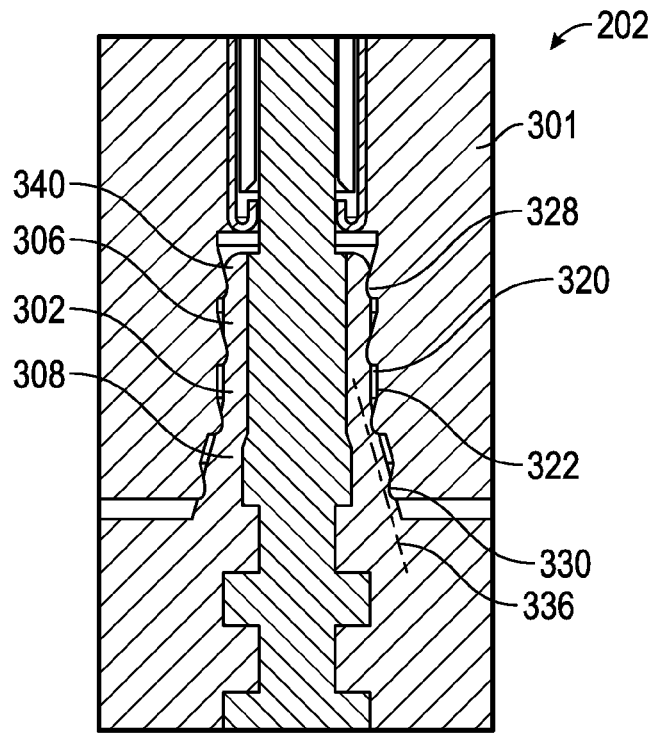
FIG. 6 shows a sealing section of an insulator and a tower of a plug according to one embodiment of the present disclosure.

Referring now to FIG. 6, the geometries of the tower 302 and the undulating profile of the sealing section 322 of the insulator 301 may be selected to control the manner in which seals are formed in the connector body 202. For instance, the relative angles of the contact surfaces of the tower 302 and the sealing section 322 may be varied and arranged such that the insertion force needed to form the seals in the seal section 320 may be kept below a specified value (e.g., torque value).

Referring still to FIG. 6, the diameter of the rings 328 and the contact surface 340 of the tower first section 306 are non-varying to obtain a "cork and bottle" type of seal. Thus, the rings 328 sequentially engage the tower first section 306 as the tower first section 306 slides through the passage 320. Accordingly, the tower first section 306 has a substantial amount of sliding contact with the "rings" 328 as seals form at the contacting surfaces. Thus, the relative sliding motion does not substantially expand the diameter of the rings 328.

In contrast, a compression type of seal is formed in the second seal section 326 (FIG. 5) by varying the diameter of the rings 330 and the tower second section 308. For example, the diameters of the contact plane 336 defining a slope of the radially inward tips of the rings 330 may be selected to correspond with the angle of the sloped surface of the tower second section 308 (e.g., interferingly contact). For example, the rings 330 and the tower second section 308 are inclined to have a greater amount of transverse contacting surface area to form seals. Thus, the rings 330 expand and compress during relative sliding between the contact surfaces.

It should be noted that the tower first section 306 may pass with minimal, if any, contact with the rings 330. Thus, a seal may be formed in the first seal section 324 without the tower 302 having to functionally engage the second seal section 326. Because the tower 302 primarily engages the first seal section 324 (FIG. 5), little, if any, insertion force is required to move the tower 302 through the second seal section 308. Moreover, when the seals are formed in the second seal section 326 (FIG. 5), a majority of the seals have already been formed in the first seal section 324 (FIG. 5). Thus, the seal formed at the second seal section 324 is formed no earlier than when the seal at the first seal section 324 (FIG. 3) is formed.

It should be understood that the present disclosure is susceptible to numerous variants. For example, referring to FIG. 6, the tower first section 306 may include a conical contact surface and the tower second section 308 may have a cylindrical contact surface. Likewise, the rings 328 may follow an inclined contact plane and the rings 330 may follow a cylindrical contact plane. In another embodiment, the tower 302 may be formed to have substantially only a conical section. In still other embodiments, the tower 302 may have two or more conical sections.

From the above, it should be appreciated that what has been described includes a connector having a connector body and an insulator disposed in the connector body. The insulator may include a plurality of female contacts and a plurality of passages, each allowing access to one of the female contacts. Also, each passage is at least partially defined by a plurality of inwardly projecting rings. The connector also includes a plug having a plurality of male contacts complementary to the female contacts. Each male contact is partially encased in a tower shaped to sealingly seat within an associated passage in the insulator.

In one embodiment, the connector may further include a cable configured to convey seismic information and a seismic device configured to communicate via the cable. The plug is connected to an end of the cable and the connector body is connected to the seismic device. Each tower has a tip and a diametrically enlarged base and each associated passage has a first seal section and a second seal section. The tower tip forms a first seal by sliding along the first seal section and the diametrically enlarged base forms a second seal by compressing the second seal section. The tip passes through the second seal section before being received in the second seal section and the second seal is formed no earlier than when the first seal is formed.

What is claimed is:

1. A connector, comprising:
   a connector body;
   an insulator disposed in the connector body, the insulator including:
   a plurality of female contacts; and
   a plurality of passages, each passage allowing access to one of the female contacts, each passage being at least partially defined by a plurality of inwardly projecting rings, wherein each passage has a first seal section and a second seal section, wherein the rings of the first seal section have a non-varying diameter relative to one another and the rings in the second seal section having a varying diameter relative to one another; and
   a plug having a plurality of male contacts complementary to the female contacts, each male contact being partially encased in a tower shaped to sealingly seat within an associated passage in the insulator.

2. The connector of claim 1, wherein the rings and the towers are configured to sealingly engage to one another in response to a substantially uniform insertion force applied to the plug.

3. The connector of claim 1, wherein a substantial portion of the rings and the towers engage simultaneously to one another.

4. The connector of claim 1, wherein a profile of at least one passage and at least one associated tower each have a conical section.

5. The connector of claim 1, wherein the inwardly projecting rings form an undulating inner sealing surface defining the passage.

6. The connector of claim 1, wherein at least one tower has a tip and a diametrically enlarged base, wherein tip does not contact the rings in the first seal section when the tower seats in the associated passage.

7. The connector of claim 6, wherein the second seal section includes at least one inwardly projecting ring having a diameter greater than the tip of the at least one tower.

8. The connector of claim 1, wherein the plurality of inwardly projecting rings have radially inward tips having a sloped contact plane.

9. The connector of claim 1, further comprising:
   a cable configured to convey seismic information, wherein the plug is connected to an end of the cable; and
   a seismic device configured to communicate via the cable, wherein the connector body is connected to the seismic device.

10. A connector, comprising:
    a connector body;
    an insulator disposed in the connector body, the insulator including:
    a plurality of female contacts, and
    a plurality of passages, each passage allowing access to one of the female contacts, each passage being at least partially defined by a plurality of inwardly projecting rings;
    a plug having a plurality of male contacts complementary to the female contacts, each male contact being partially encased in a tower shaped to sealingly seat within an associated passage in the insulator;
    a cable configured to convey seismic information, wherein the plug is connected to an end of the cable;
    a seismic device configured to communicate via the cable, wherein the connector body is connected to the seismic device;
    wherein each tower has a tip and a diametrically enlarged base, wherein each associated passage has a first seal section and a second seal section, wherein the tip forms a first seal by sliding along the first seal section and the diametrically enlarged base forms a second seal by compressing the second seal section, wherein the tip passes through the second seal section before being received in the first seal section, and wherein the second seal is formed no earlier than when the first seal is formed.

11. The connector of claim 10, wherein the rings and the towers are configured to sealingly engage to one another in response to a substantially uniform insertion force applied to the plug.

12. The connector of claim 10, wherein a substantial portion of the rings and the towers engage simultaneously to one another.

13. The connector of claim 10, wherein a profile of at least one passage and at least one associated tower each have a conical section.

14. The connector of claim 10, wherein the inwardly projecting rings form an undulating inner sealing surface defining the passage.

15. The connector of claim 10, wherein the tip does not contact the rings in the second seal section when the tower seats in the associated passage.

16. The connector of claim 15, wherein the second seal section includes at least one inwardly projecting ring having a diameter greater than the tip of the tower.

17. The connector of claim 10, wherein the plurality of inwardly projecting rings have radially inward tips having a sloped contact plane.

18. A method of forming a connection, comprising:
  disposing an insulator in a connector body of a connector, the insulator including:
    a plurality of female contacts; and
    a plurality of passages, each passage allowing access to one of the female contacts, each passage being at least partially defined by a plurality of inwardly projecting rings, and wherein each passage has a first seal section and a second seal section;
  forming a plug having a plurality of male contacts complementary to the female contacts, each male contact being partially encased in a tower shaped to sealingly seat within an associated passage in the insulator, wherein each tower has a tip and a diametrically enlarged base;
  engaging the plug with the connector;
  connecting the plug to an end of a cable configured to convey seismic information;
  connecting the connector body to a seismic device configured to communicate via the cable;
  forming a first seal by sliding the tower tip along the first seal section; and
  forming a second seal by compressing the diametrically enlarged base against the second seal section, wherein the tower tip passes through the second seal section before being received in the first seal section, and wherein the second seal is formed no earlier than when the first seal is formed.

* * * * *